(12) United States Patent
Glaser et al.

(10) Patent No.: US 9,770,987 B1
(45) Date of Patent: Sep. 26, 2017

(54) SAFETY VISUALIZATIONS FOR NAVIGATION INTERFACE

(71) Applicants: VOLKSWAGEN AG, Wolfsburg (DE); AUDI AG, Ingolstadt (DE)

(72) Inventors: Erik Glaser, San Francisco, CA (US); Jaime Camhi, San Jose, CA (US); Dij Jayaratna, San Francisco, CA (US)

(73) Assignees: Volkswagen AG (DE); Audi AG (DE)

( * ) Notice: Subject to any disclaimer, the term of this patent is extended or adjusted under 35 U.S.C. 154(b) by 0 days.

(21) Appl. No.: 15/240,759

(22) Filed: Aug. 18, 2016

(51) Int. Cl.
*B60Q 1/00* (2006.01)
*G09F 9/00* (2006.01)
*B60K 35/00* (2006.01)
*B60Q 9/00* (2006.01)

(52) U.S. Cl.
CPC ............... *B60K 35/00* (2013.01); *B60Q 9/00* (2013.01); *B60K 2350/106* (2013.01); *B60K 2350/2008* (2013.01); *B60K 2350/2069* (2013.01)

(58) Field of Classification Search
CPC ........... B60K 35/00; B60K 2350/2069; B60K 2350/2008; B60K 2350/106; B60Q 9/00
See application file for complete search history.

(56) References Cited

U.S. PATENT DOCUMENTS

| 2003/0090392 | A1* | 5/2003 | Schuessler ........... G08G 1/0965 340/988 |
| 2004/0193347 | A1* | 9/2004 | Harumoto ........... B60R 21/0132 701/45 |
| 2010/0182140 | A1* | 7/2010 | Kohno ................... B60K 35/00 340/438 |
| 2011/0087433 | A1  | 4/2011 | Yester |
| 2014/0375448 | A1* | 12/2014 | Lee ........................ B60Q 1/444 340/479 |
| 2015/0179066 | A1  | 6/2015 | Rider et al. |
| 2016/0347391 | A1* | 12/2016 | Krispin ..................... B62J 6/00 |

FOREIGN PATENT DOCUMENTS

| DE | 102006036241 A1 | 2/2008 |
| DE | 102014200407 A1 | 7/2015 |
| EP | 1491857 A1 | 12/2004 |
| EP | 1561631 A2 | 8/2005 |

* cited by examiner

*Primary Examiner* — Erin File
(74) *Attorney, Agent, or Firm* — Barnes & Thornburg LLP

(57) ABSTRACT

An in-vehicle safety visualization system and method for coordinating driver alerts with a navigation system. Driver alert systems are interfaced with a display that is also used for depiction of navigation system images and information, allowing driver alerts to be shown at a location in which the driver's attention is likely to be directed, in addition to the locations dictated by the driver alert systems.

14 Claims, 11 Drawing Sheets

SAFETY VISUALIZATIONS FOR NAVIGATION INTERFACE

BACKGROUND

The present disclosure relates to systems, components and methodologies for vehicle assistance apparatuses. In particular, the present disclosure relates to the driver alert functionality of vehicle assistance systems, components and methodologies.

Navigation systems help a driver reach an unfamiliar destination. In-vehicle navigation systems generally include a display in the center of the dashboard that shows the location of the vehicle (referred to as the "carsor") on a map of the environment. Many vehicles also include driver assistance systems such as blind spot detection, adaptive cruise control, collision alerts and other driver alert systems. The alerts from these driver assistance systems are typically communicated via light emitting diodes or human-machine interfaces at various locations on the vehicle.

While a driver is using a navigation system, it is likely the driver will be diverting attention to the navigation system display for significant periods of time. Due to this increased cognitive load, the driver may be less likely to notice the warnings or alerts from the vehicle's driver assistance systems, such as blind spot warning, collision warning, or adaptive cruise control (ACC) proximity warning. The present disclosure relates to driver alert systems that may be employed during in-vehicle navigation system use, for example, to supplement alerts generated by existing driver assistance systems or other alert-generating equipment.

SUMMARY

According to the present disclosure, systems, components and methodologies are provided for coordinating driver alerts with a navigation system via a safety visualization system.

In illustrative embodiments, one or more driver alert systems, such as a driver assistance system, are interfaced with a display that is also used for depiction of navigation system images and information, allowing driver alerts to be shown at a location in which the driver's attention is likely to be directed, in addition to the locations dictated by the driver alert systems. The safety visualization system is activated when the navigation system is in use. The safety visualization system, components and methodologies are configured to supplement alerts displayed at locations on the vehicle such as the windshield, rearview mirror and side mirrors, for example.

BRIEF DESCRIPTION OF THE DRAWINGS

Disclosed embodiments will be explained below on the basis of the associated drawings. In the drawings.

DETAILED DESCRIPTION

Figure 1:
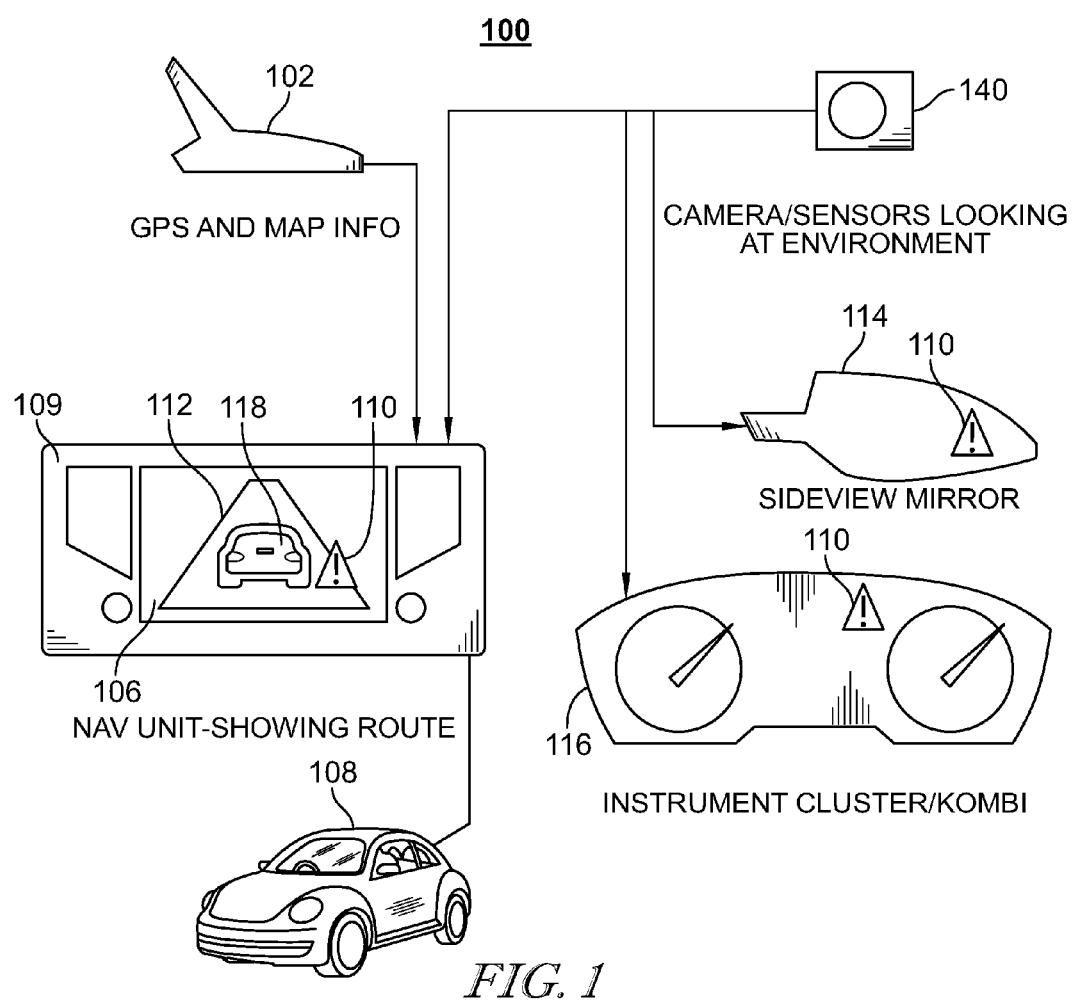
FIG. 1 shows the coordination between streams of information from a navigation system and a driver alert system to produce a display depicting a map integrated with a driver alert icon according to an exemplary embodiment. The alert is simultaneously shown on a side view mirror and an instrument cluster.

Illustrative embodiments of the disclosed safety visualization system display real time driver assistance alerts or other warnings in response to signals from vehicle alert systems, combined with information produced by a navigation system, on a human-machine interface (HMI). The combination of alerts and navigation system information may be in the form of text, icons, symbols or other graphics appearing directly on or near a carsor (i.e. image of vehicle on a navigation map) or by activating light emitting diodes (LEDs) or other signals adjacent to or in sufficient proximity to the navigation display to be noticeable by a driver whose attention is directed to the navigation display. Alerts may be stationary or may change in relation to a carsor depicted on the navigation map to depict the spatial relationship of the hazard with respect to the vehicle. In illustrative embodiments, the alert display method and location dictated by the vehicle alert system, such as a driver assistance system, is not removed or replaced, but instead is supplemented by the safety visualization system. The safety visualization system may thus condense safety-relevant information in the area of highest attention from the driver. Alerts can include or be in the form of graphics to illustrate hazards in relation to the carsor.

Combining navigation system information with driver alerts provides a driver with multiple sensory inputs on a single display or within close proximity to one another. A driver may subconsciously process part of this sensory input at the expense of other portions so the combined system must account for inherent cognitive mechanisms to improve the probability that the driver will recognize the alert as a priority if the situation warrants. A suitable alert ranking or relevancy system may be incorporated into the safety visualization system which may improve that probability.

Communication between the vehicle alert systems and the safety visualization system may be, for example, by signals transmitted via a control area network (CAN) bus or other message-based protocol that would allow processors of the various systems to communicate with each other.

Some driver alert systems initiate warnings or take action based on information from related systems. For example, an ACC system may work together with a radar-controlled front assist traffic monitoring system. The front assist traffic monitoring system detects traffic slowing ahead, which signals the ACC system to decrease the speed of the vehicle. Thus, the safety visualization system of the present disclosure may be configured to act on a signal from the front assist traffic monitoring system, possibly the same signal sent to the ACC system, or it may respond instead to a signal from the ACC system after the ACC system receives the front assist traffic monitoring system signal. The safety visualization system may also respond to signals from both systems, providing related or continuing alerts. In general, the safety visualization system can be configured to receive and act upon signals from a variety of systems that work either independently or in conjunction with one another. Thus, a single event may be represented as more than one alert by the safety visualization system.

Exemplary embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. The terms first, second, third, etc. or other numerical designation may be used to distinguish one element from another without implying sequence. In some illustrative embodiments, well-known processes, well-known device structures, and well-known technologies are not described in detail.

Terminology may be used herein for the purpose of describing particular illustrative embodiments only and is not intended to be limiting. The singular form of elements may be intended to include the plural forms, unless the context indicates otherwise. The method steps, processes, and operations described herein are not to be construed as necessarily requiring their performance in the particular order discussed or illustrated, unless specifically identified as an order of performance or a particular order is inherently necessary for embodiment to be operational. It is also to be understood that additional or alternative steps may be employed.

It is noted that in some embodiments elements that are connected or otherwise coupled with one another may be directly coupled or may have intervening elements. Other words used to describe the relationship between elements should be interpreted in a like fashion (e.g., "between," "adjacent," etc.).

The phrase "driver vehicle" is used in some instances to identify the vehicle in which a safety visualization system is operating from a vehicle that may pose hazards.

Embodiments in accordance with the disclosure include the methods described herein and their equivalents, non-transitory computer readable media programmed to carry out the methods and a computer system configured to carry out the methods. Further included is a vehicle comprising components that include any of the methods, non-transitory computer readable media programmed to implement the instructions or carry out the methods, and systems to carry out the methods. The computer system, and any sub-computer systems will typically include a machine readable storage medium containing executable code; one or more processors; memory coupled to the one or more processors; an input device, and an output device connected to the one or more processors to execute the code. A machine-readable medium may include any mechanism for storing or transmitting information in a form readable by a machine, such as a computer processor. The information may be stored, for example, in volatile or non-volatile memory.

Modules, data structures, and the like are referred to as such for ease of discussion, and are not intended to imply that any specific implementation details are required. For example, any of the described modules or data structures may be combined or divided into sub-modules, sub-processes or other units of computer code or data as may be required by a particular design or implementation. In the drawings, specific arrangements or orderings of schematic elements may be shown for ease of description but may be suitably modified to implement embodiments of the disclosure. In general, schematic elements used to represent instructions or modules may be implemented using any suitable form of machine-readable instruction, and each such instruction may be implemented using any suitable programming language, library, API, or other software development tools or frameworks. Similarly, any suitable electronic arrangement or data structure of elements described may be implemented. Further, some connections, relationships or associations between elements may be simplified or not shown in the drawings so as not to obscure the disclosure.

It will also be understood that the term "module" as used herein does not limit the functionality to particular physical modules, but may include any number of tangibly-embodied software or hardware components. A module will typically comprise a tangible computer readable medium having computer-readable program code embodied therein, wherein the computer-readable program code is adapted to be executed by a processor (working in connection with an operating system) to implement one or more functions and methods of the module. In this regard, the program code may be implemented in any suitable language and as any suitable type of code. A module may also comprise a plurality of modules functioning in concert to carry out the intended function.

FIG. 1 is a schematic of an illustrative embodiment showing an output signal of navigation system 102 combined with an output signal of a camera or other sensor 140, for depiction on a display screen 106 as an output of a safety visualization system 100. Display screen 106 may be part of an in-vehicle display unit integrated into a dashboard of a driver vehicle 108, for example. A driver alert 110 is shown superimposed on an in-vehicle map 112, which is displayed on display screen 106. Driver alert 110 is also displayed on a side view mirror 114 and an instrument cluster 116. The term "superimposed" is used broadly to include any mechanism for combining navigation map 112 and driver alert 110 on a single display. In this illustrative embodiment, driver alert 110 obstructs a portion of in-vehicle navigation map 112. Driver alert 110 may also be shown adjacent to navigation map 112 on a single screen, in close proximity to display screen 106 or otherwise integrated with navigation map 112.

Upon an alert trigger event, such as an obstacle in the path of vehicle 108, safety visualization system 100 applies driver alert 110 that, for example, may be in the form of text, a symbol or a combination of text and symbols, on or in the vicinity of in-vehicle navigation map 112. A driver alert 110 in the vicinity of in-vehicle navigation map 112 may be on display screen 106, for example, with in-vehicle navigation map 112 reduced in size to accommodate driver alert 110 on display screen 106, or it may be on separate screens or devices adjacent to display screen 106. A single display screen may be electronically segmented to facilitate placement of driver alert 110.

When driver alert 110 is triggered by a detected obstacle in the driver vehicle's path or other triggering event, it appears in multiple locations simultaneously, such as on display screen 106, and in addition, on side view mirror 114 or instrument cluster 116, for example. Alert 110 may appear on display screen 106 as a specific human machine interface (HMI) element, such as an icon or a symbol with a transparent background appearing directly next to a carsor 118, for example. Carsor 118 is an icon showing the location of driver vehicle 108 on in-vehicle navigation map 112. Alert 110 remains visible for the duration of a pre-defined alert period, for example until the danger is no longer present such as when an obstacle is no longer in the path of driver vehicle 108. An obstacle may move out of the way of driver vehicle 108, or the driver may steer around the obstacle, thereby eliminating the danger associated with the obstacle.

To highlight the importance of alert 110, a semi-transparent dark background may be incorporated behind or around driver alert 110 to increase contrast for better visibility. In-vehicle navigation map 112 likely will contain many colors, so a semi-transparent dark background will generally catch a driver's attention. A semi-transparent background allows features of in-vehicle map 112 to still be visible. Other contrast-enhancing attributes may also be used. In the case of a very high-priority driver alert 110, such as an imminent obstacle encounter, driver alert 110 may be increased in size and paired with additional alert mechanisms, such as an audio alert in the form of a beep or a chime sound, for example.

In-vehicle navigation map 112 will typically represents a cognitively heavy load that may require deemphasizing so the driver readily becomes aware of driver alert 110. Whether, or to what extent, the cognitive load is deemphasized may be based on the nature of driver alert 110. Alternatively, or in addition to deemphasizing in-vehicle navigation map 112, driver alert 110 can be presented in a manner that makes it appear more relevant to the driver than the map.

Various factors can be weighed by safety visualization system 100 to determine the preferred attributes of driver alert 110 to maximize the likelihood the driver will notice driver alert 110 and take appropriate action in time to ensure heightened safety. Illustrative attributes include placement, appearance, timing, light intensity, audio supplement, visual emphasis or de-emphasis, color, background characteristics, quality, size and pairing with other alerts. Safety visualization system 100 may also be configured to have all or some driver alerts 110 appear in the same position or have similar appearances, such as light intensities.

Depending on the nature of driver alert 110, the driver's immediate attention may be required or acknowledgement in due time may be sufficient. Therefore, the placement and timing of driver alert 110 may be a function of the type of alert.

It is possible that two or more alerts will be generated simultaneously or during a time period when displaying them together may be beneficial. Accordingly, driver alerts 110 may be prioritized and associated appearance, timing, positioning and other attributes may be applied. For example, obstacles detected in the path of vehicle 108 may be considered higher priority than a vehicle in a vehicle 108 blind spot. In an illustrative embodiment, priority is based on the relative position and proximity to the vehicle of an obstacle and the current speed of the vehicle defining the highest priority. In general a situation with a higher probability of an obstacle endangering the safe operation of the vehicle will have a higher priority. The priority values may be based, at least in part, on degree of danger associated with the situation. For example, situational or environmental status warnings such as blind spot detection may have a lower priority value than an obstacle in the path of vehicle 108. Blind spot detection systems typically have two levels of urgency. A first level of urgency is associated with detecting a vehicle in the blind spot of driver vehicle 108. A second urgency level may be associated with the driver activating the turn signal indicating he intends to turn into a blocked lane, or the driver beginning to maneuver driver vehicle 108 into the blocked lane. The second urgency level would be greater than the first urgency level because now a collision is more probable. A second urgency level may generate an alert 110 on an in-vehicle navigation map concurrently with an alert such as a rapidly blinking light in the side view mirror.

Active lane keeping assist is another illustrative alert system. Active lane keeping assist detects when a driver strays from the boundary of the lane in which it is operating, upon which the system generates an alert or corrective measure. Active lane keeping assist may have a low warning state when driver vehicle 108 gets close to exiting the lane, and a high warning state when driver vehicle 108 has exited the lane and may now be in a less safe position.

Hierarchy attributes associated with driver alerts 110, including intensity, quality and positioning, for example, can be implemented by a logic filter in the head unit software to trigger low HMI alerts when low warnings are received, or high HMI alerts when high alerts are received. In an illustrative embodiment, the low/high warning decisions are made by specific alert systems such as an ACC system instead of by the safety visualization system 100. In general, safety visualization system 100 can be designed to utilize hierarchy algorithms in existing alert system or can include separate hierarchy algorithms. In an exemplary embodiment, safety visualization system 100 utilizes its own hierarchy algorithms if no such algorithms are present in the existing alert systems, or to override or take priority to them.

The positioning and quality of driver alerts 110, and alerts present elsewhere that are associated with driver alerts 110 appearing on display screen 106, will generally be proportional to the chance of physical contact between driver vehicle 108 and an obstacle based on vehicle speed and location of obstacle. The quality of driver alerts 110 may include variations in intensity, size, color and whether or not it is paired with an additional alert such as an audio chime or beep, for example.

Driver alerts 110 are particularly effective on in-vehicle navigation map 112 because a driver's attention may be directed to the map. In-vehicle navigation map 112 may provide a naturally-mapped visual layout to show dangers in relation to the position of driver vehicle 108. In-vehicle navigation map 112 may include a symbol representing driver vehicle 108 on the road, which may be configured as a vehicle so dangers in its vicinity will be referenced to driver vehicle 108, thereby providing more realistic or enhanced safety information. Alerts may show in real time the changes in the hazard situation, such as a vehicle approaching a blind spot of driver vehicle 108. Safety visualization system 100 may simulate camera views such as seen on a vehicle display screen 106 when the vehicle is reversing, for example, by providing graphics showing carsor 118 in relation to obstacles. Such a display may make the nature of a hazard more readily understood and efficiently processed by a driver, compared to stationary alerts, such as icons.

Additional use of light emitting diode (LED) warnings in the center stack area of driver vehicle 108, i.e. in the vicinity of display screen 106, could be generated in the event of higher urgency warnings. This may emphasize the urgency level and also serve to alert a driver that may not be visually engaged with in-vehicle navigation map 112, even though it is activated. The system, thus, in an exemplary embodiment duplicates existing alerts rather than replacing them. Alerts may be activated on any number of locations in addition to on in-vehicle navigation map 112.

Figure 2:
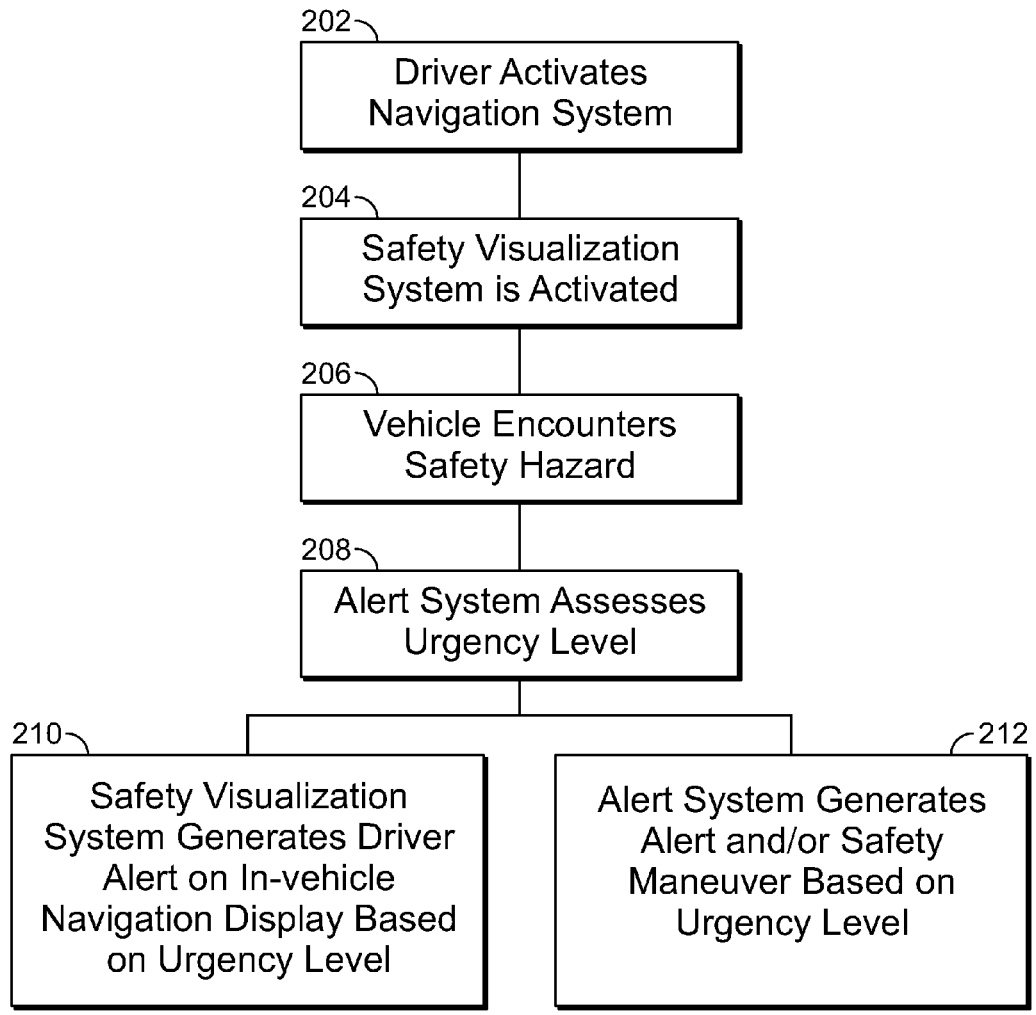
FIG. 2 is a flowchart illustrating a safety visualization system being activated when a navigation system is in use that displays alerts on a navigation system map and other vehicle locations, wherein the alerts have attributes according to urgency level.

FIG. 2 is a flowchart of an illustrative embodiment of a method executed by a processor of safety visualization system 100 in a vehicle that has one or more alert systems in addition to safety visualization system 100. A driver activates an in-vehicle navigation system 102 in step 202. Activation of in-vehicle navigation system 102 triggers activation of safety alert system 100 in step 204. This illustrative embodiment is directed to use of an in-vehicle navigation system that typically is hard-wired in a vehicle although could be incorporated wirelessly. Safety visualization system can also be configured to operate with other navigation systems, such as stand-alone devices or software applications on tablet computers or smart phones, for example, provided the navigation systems are compatible with such a configuration.

In step 206, driver vehicle 108 encounters a safety hazard such as an obstacle in its path or in its blind spot, for example. In step 208 the urgency level of the hazard is assessed by an alert system configured to recognize and act on the particular type of hazard encountered to determine what attributes driver alert 110 should have and possibly to establish what corrective measures should be taken. Substantially concurrently, steps 210 and 212 take place in which safety visualization system 100 generates a driver alert 110 on in-vehicle navigation map 112 and the alert system associated with the hazard type generates one or more alerts in a different location or form. Any of the alerts generated may have attributes based on the urgency level.

Vehicles are often equipped with a number of alert systems. Some may relate to the engine, fluid levels and maintenance requirements for example. Other alerts system such as blind spot detection, active lane keeping, or ACC may also be present. In an illustrative embodiment, only alerts associated with potential collisions, road departures or other such moving vehicle safety events, are incorporated into safety visualization system 100. Mechanical, electrical or structural warnings, for example, could also be incorporated into safety visualization system for display on or in the vicinity of in-vehicle navigation map 112. Optionally, safety visualization system 100 may be configured so a user can disable the system and rely solely on existing alerts.

Figure 3:
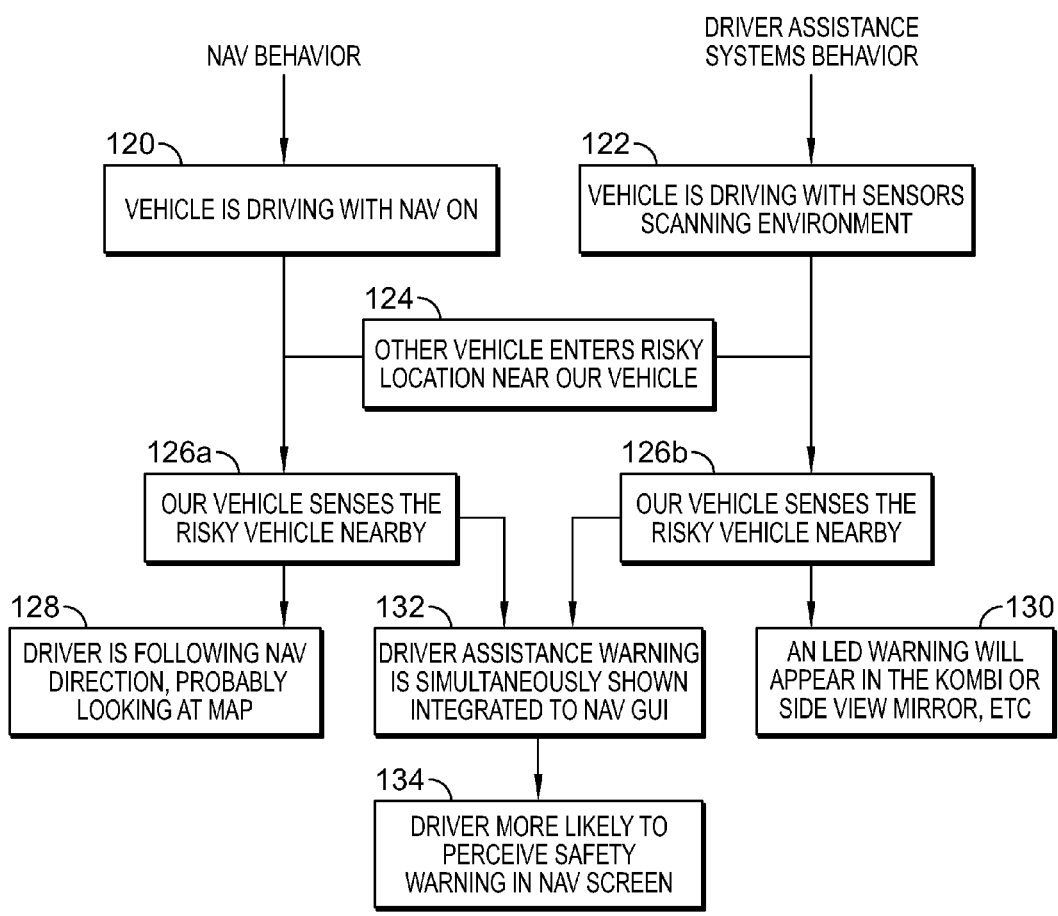
FIG. 3 is a flowchart of an illustrative embodiment showing the interaction between a navigation system and a driver assistance system to produce a driver alert integrated with a navigation graphic user interface, and also produce the alert as a warning on an instrument panel, side view mirror or elsewhere on the vehicle.

FIG. 3 is a flowchart illustrating an exemplary embodiment of navigation behavior and driver assistance behavior and the interrelationship in safety visualization system 100, according to an illustrative embodiment. A first vehicle's navigation system is activated as provided in block 120. Also operational is a driver assistance system, in which sensors are scanning the environment as provided in block 122 to determine whether there are events to which a driver should be informed. An event 124 includes a second vehicle entering a location near the first vehicle, thereby posing a safety risk to the first vehicle. The first vehicle senses the risk, as indicated in blocks 126*a,b*. Block 128 shows that the driver of the first vehicle has her attention on the navigation map. While the driver's attention is on the navigation map, an alert from a driver assistance system in the form of an LED warning appears on the instrument cluster, side view mirror or other location on the vehicle, as provided in block 130. Block 132 indicates that the driver alert is simultaneously shown on the navigation map, where the driver is more likely to perceive the safety warning, as noted in box 134.

Figure 4:
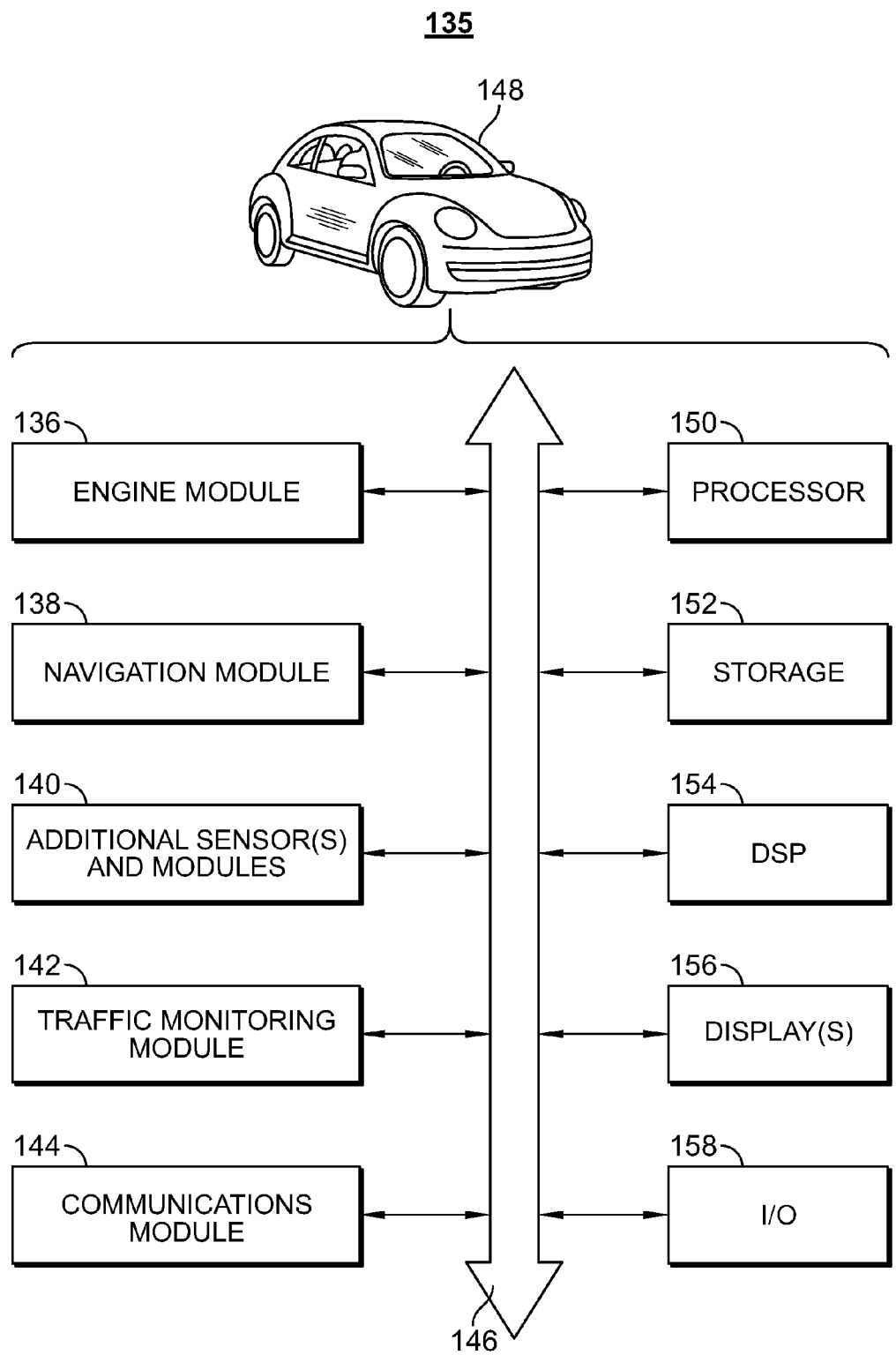
FIG. 4 is a schematic of an exemplary vehicle computing system comprising illustrative modules that may generate driver alerts such as an engine module, navigation module, or traffic monitoring module. Also shown are additional sensors that may be incorporated into or provide input to various alert-generating systems. A communications module may allow any of the modules to communicate with each other or external devices. Modules may be communicatively coupled to a data bus for transmitting/receiving data and information from other modules. A main processor centrally processes and controls data communication throughout the vehicle computer control system.

FIG. 4 illustrates an exemplary vehicle computing system 135 in which a safety visualization system 100 may operate. Vehicle computing system 135 is shown as comprising various vehicle modules, subsystems or components. In this illustrative embodiment, engine module 136 is included to process and provide vehicle engine and transmission characteristic or parameter data, and may comprise an engine control unit (ECU), and a transmission ECU. Engine module 136 may generate alerts related to engine or transmission problems, for example. These alerts are typically displayed on a vehicle dashboard as LED or other lighted warnings.

Navigation module 138, which may have a global positioning system (GPS) incorporated therein, provides navigation processing and location data for vehicle 148. Navigation module 138 generates navigation maps, for example on a display screen, to assist a driver in navigating to a desired destination or to indicate a vehicle's geographic position, among other utilities.

Sensors 140 provide sensor data that may comprise data related to vehicle characteristic or parameter data, and may also provide environmental data pertaining to vehicle 148, its interior or surroundings, such as temperature, humidity and the like. Other sensors 140 may include proximity sensors or cameras for sensing objects or traffic proximate to vehicle 148. Additional sensors 140 may be incorporated into or provide input to various alert-generating systems.

Traffic monitoring module 142 may provide data relating to obstacles in the vicinity of vehicle 148, for example.

Communications module 144 may allow any of the modules to communicate with each other or external devices via a wired connection or wireless protocol, for example, short-range wireless interconnections, CAN or LIN bus systems, etc. In one embodiment, components 136, 138, 140, 142 may be communicatively coupled to bus 146 for certain communication and data exchange purposes. Safety visualization system 100 may also be coupled to bus 146.

Vehicle 148 may further comprise a main processor 150 that centrally processes and controls data communication throughout vehicle computer control system 135. Storage 152 may be configured to store data, software, media, files and the like. Digital signal processor (DSP) 154 may comprise a processor separate from main processor 150, or may be integrated within processor 150. Generally, DSP 154 may be configured to receive signals, such as voice, audio, video, temperature, pressure, position, etc. that have been digitized and then process them as needed. Display 156 may be configured to provide visual indicia, images or text from modules or sensors, such as those shown in FIG. 4, and may comprise one or more of an LCD, LED display, OLED display, or any other suitable display. Output devices other than displays may be incorporated into vehicle computer control system 135, for example, audio output devices. Input or output module 158 is configured to provide data input and output to or from other peripheral devices, such as device controllers and the like. Modules may be communicatively coupled to data bus 146 for transmitting or receiving data and information from other modules.

Figure 5:
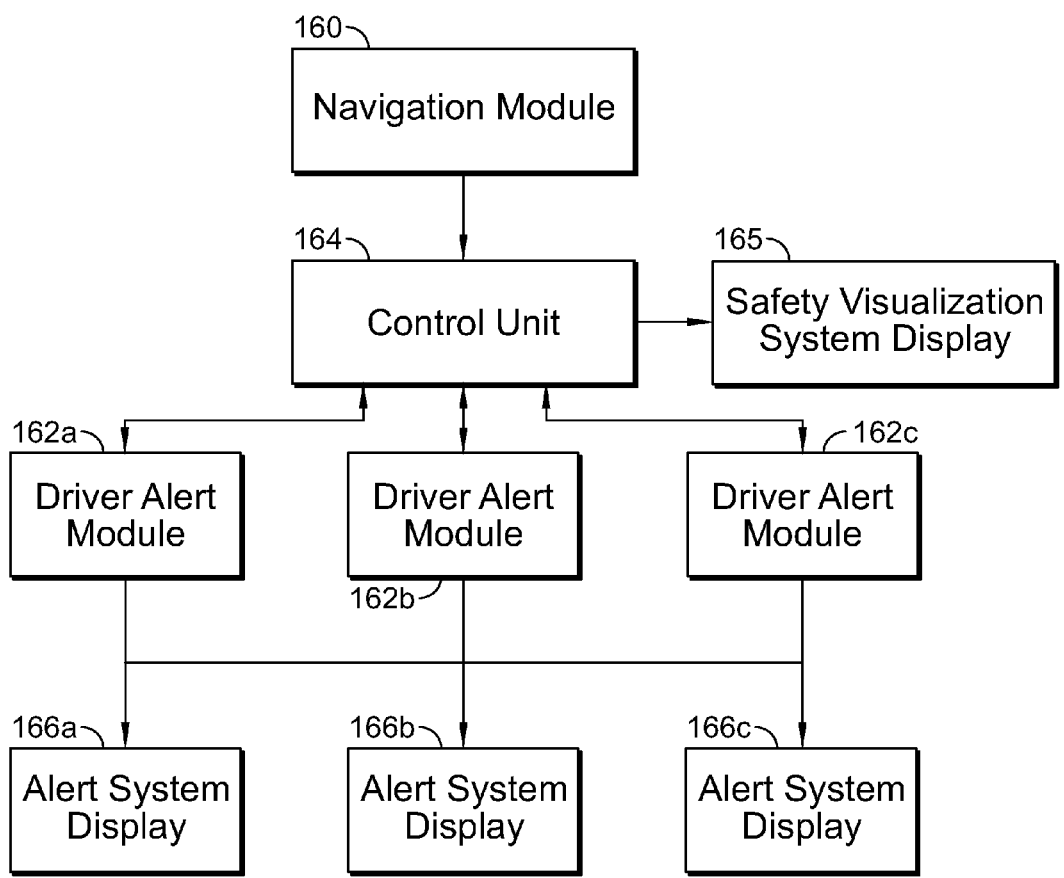
FIG. 5 shows an overview of a safety visualization system that includes a navigation module, driver alert modules, an output device, and components thereof.

FIG. 5 is a simplified block diagram of an illustrative embodiment of safety visualization system 100 that may be part of a vehicle computing system 135, such as shown in FIG. 4. Safety visualization system 100 comprises a navigation module 160, driver alert modules 162*a-c* and output devices 166*a-c*, shown as "displays" in FIG. 5, and a control unit 164. The various modules are systems or parts of systems that may be embodied as hardware, firmware, software, or a combination thereof. For example, the various modules, logic, and other components of safety visualization system 100 may form a portion of, or otherwise be established by, processor 178 or other hardware components of safety visualization system 100, which will be described in more detail with respect to FIG. 6.

Navigation module 160 is communicatively connected to control unit 164. Control unit 164 receives input from navigation module 160 indicating that the navigation system is activated. Safety visualization system 100 may become active upon activation of the navigation system, or it may repeatedly check for navigation system use on an on-going basis. Control unit 164 also receives signals from driver alert modules 162*a-c*. When control unit 164 recognizes that the navigation system is activated, control unit 164 will cause driver alerts 110 to be shown on display 165 in a location likely to be observed by a driver who is utilizing the navigation system, such as on display screen 106 where navigation map 112 is shown. Driver alerts 110 may alternatively or in addition be shown in close proximity to display screen 106. The driver alert images generated by control unit 164 may be in addition to driver alerts generated elsewhere on the vehicle by driver alert modules 162*a-c*, such as on the windshield, rearview mirror and side mirrors, for example.

Each driver alert module 162*a-c* may be individually in communication with control unit 164, or they may be part of a single system that coordinates or directs signals to control unit 164, such as via a controller area network (CAN) bus or other bus system. Each driver alert module 162*a-c* may be individually connected to one or more display devices 166*a-c* or driver alert modules 162*a-c* may be integrated with one another. Additional driver alert modules and display devices may be similarly connected. It is further noted that some or all of the display devices could be substituted with other output devices such as audio or non-display screen LED devices.

Driver alert modules 162*a-c* may include for example, a blind-spot detection module, adaptive cruise control module, or collision alert module. Alerts may relate to, for example, driving maneuvers such as to avoid obstacles, change lanes or decelerate, or to mechanical or electrical issues experienced by the vehicle or its components.

Navigation module 160 is configured to generate or receive navigation map 112. In the illustrative embodiment, safety visualization system 100 is coupled to a vehicle 108, and includes in-vehicle display unit 109, having display screen 106, typically installed in the dashboard of vehicle 108. In an illustrative operation, navigation module 160 obtains the location of the vehicle via a location determining module, receives navigation map 112 that is related to the current location of the vehicle, processes and incorporates any destination information input by the user via a directions module, and determines what map elements to represent on display screen 106. Navigation module 160 may continually receive and process current information to update the displayed navigation map 112, associated directions and any other map-related features.

Navigation module 160 may interface with a navigation application through any requisite communication mechanisms and protocols needed for effectuating inter-component, inter-device or network communications. For example, navigation module 160 can interface with an Application Programming Interface (API) of a currently running application to obtain the current location of vehicle 108.

Navigation module 160 may include a map generator module that may be configured to generate a navigation map for output on display screen 106. In some embodiments, the map generator module may be configured to ensure that the generated navigation map 112 is scaled appropriately and includes appropriate amount of detail to be displayed on a display such as a vehicle-mounted display, for example. The presence of a driver alert 110 may be considered in the determination of the appropriate amount of detail or other parameters of navigation map 112. Computerized navigation maps may be highly detailed, containing large amounts of information. This may be factored into how and where a driver alert 110 is displayed.

The map generator module need not create the navigation map, but rather may retrieve the map from another application associated with or used by the vehicle computing device or system, such as a navigation application. In some embodiments, the navigation module may include map data received from data storage or from other computing devices or networks. In an illustrative embodiment, the map generator module may obtain a navigation map by interfacing with a navigation application via an application programming interface (API). In other embodiments, safety visualization system parameters may be features of the navigation application.

Display 165 may be display screen 106 that is part of an in-vehicle display unit 109, and may be for example, an LCD or LED display screen. Display screen 106 may be configured to display information associated with one or more ECUs or other systems, such as navigational systems, temperature control units and entertainment systems that may be part of a vehicle computing system of which safety visualization system 100 is also a part (see FIG. 6, for example). Each system integrated with display screen 106 may be configured to respond to signals from sensors or other input devices. The various ECU's may be connected through a CAN bus system or other electronic arrangement. The CAN bus system typically allows input from the various sensors and computers to circulate throughout the vehicle at all times, or at designated times or intervals, so as to be available upon request by ECUs. The aforementioned illustrative system allows information to be available to ECUs without a host computer; however, a central hub or routing system can also be implemented. A local interconnect network (LIN) protocol may also be used for communication between vehicle components. In general, components of safety visualization system 100 may be in communication with one another via one or more networks or other types of suitable communication links.

Figure 6:
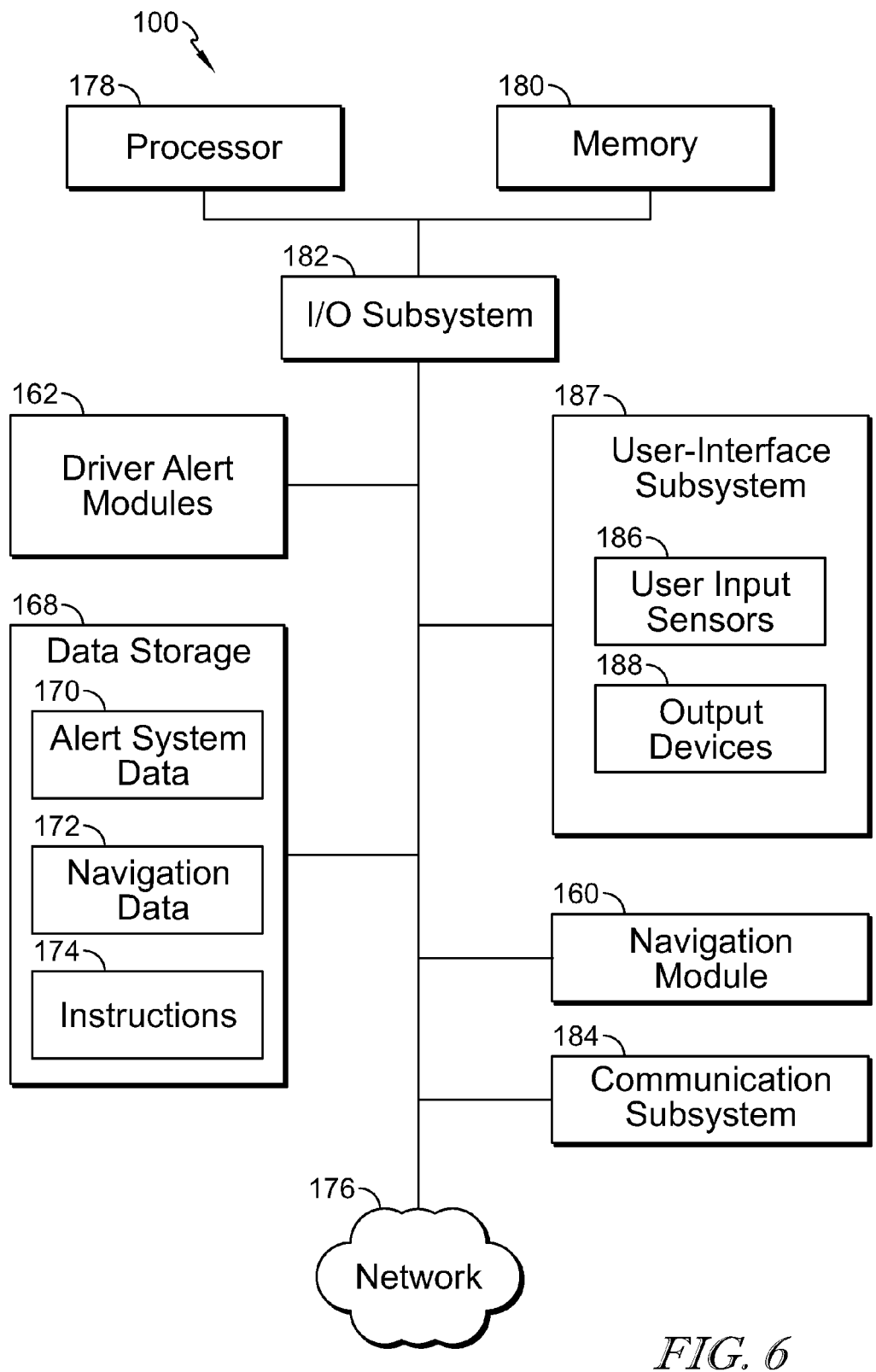
FIG. 6 shows a vehicle computing system highlighting safety visualization system components.

FIG. 6 shows components of safety visualization system 100 incorporated into a vehicle computing system, such as system 135 shown in FIG. 4. Safety visualization system 100 is controlled primarily by computer readable instructions, which may be in the form of software instructions 174 stored on a tangible data storage device 168, such as a magnetic disk hard drive, sold state drive, optical disk, or high-speed read only memory (ROM), random access memory (RAM) or the like. Also stored on storage device 168 are navigation data 172 and alert system data 170.

While the illustrative embodiments shown in FIGS. 5 and 6 include multiple components and devices, it should be understood that safety visualization system 100 may constitute a single computing device, alone or in combination with other devices. Each device or component shown or described may also be present as a single component or multiple components. For example data storage device 168 may be a single memory device or may comprise a plurality of memory devices. It is further noted that safety visualization system 100 may be distributed across multiple computing devices that are connected to a network(s) 176.

Illustrative safety visualization system 100 includes at least one processor 178 (e.g. a microprocessor, microcontroller, digital signal processor, etc.), memory 180, and an input/output (I/O) subsystem 182. Instructions 174 may be executed by processor 178. In operation, processor 178 fetches and executes instructions and information, and generates and transfers information to and from other resources coupled to or in data communication with processor 178. Safety visualization system 100 may be embodied as any type of computing device or devices capable of performing the functions described herein. Although not specifically shown, it should be understood that I/O subsystem 182 typically includes, among other things, an I/O controller, a memory controller, and one or more I/O ports. Processor 178 and I/O subsystem 182 are communicatively coupled to memory 180. Memory 180 may be embodied as any type of suitable computer memory device, for example, volatile memory such as various forms of random access memory). In some embodiments, memory 180 is RAM and may temporarily store instructions and data retrieved from other, sometimes slower, storage devices as needed for current operations, from which they can be more quickly read and processed by processor 178 or other hardware devices. I/O subsystem 182 is communicatively coupled to a number of hardware or software components, including the components of the safety visualization system 100.

I/O subsystem 182 is also communicatively couples to data storage device 168 and a communication subsystem 182. Data storage device 168 may include one or more suitable data storage devices. In some embodiments, portions of safety visualization system 100 resides at least temporarily in storage device 168, e.g., navigation data 172, alert system data 170, and instructions 174. In other embodiments, portions of safety visualization system 100 may be copied to memory 180 during operation of safety visualization system 100, such as for faster processing or other reasons. Data storage components 170, 172, 174 may each be a portion of other components of safety visualization system 100, such as driver alert modules 162 or navigation module 160.

Safety visualization system 100 includes a user-interface subsystem 187, which includes one or more sensor(s) 186 for detecting user inputs (e.g., a touchscreen, virtual keypad, microphone, camera, buttons, keyboard, mouse, microphone, etc.) and one or more output device(s) 188 (e.g., display, speakers, LEDs, etc.). Users may provide input, for example, to remove an alert, or access additional information about the alert if available. In general, user-interface subsystem 187 may include, for example, a touchscreen display, a touch-sensitive keypad, a gesture or pressure-detecting device, an eye-tracking sensor, or other devices that are capable of detecting human interactions with a computing device.

Navigation module 160 includes sensors that provide safety visualization system 100, or a component in communication with safety visualization system 100, information regarding the speed, location, and environment in which vehicle 108 may be operating. In-vehicle navigation module 160 may include a global positioning system (GPS) module that is operable to determine a geographic position of vehicle 108, such as by communicating with a plurality of GPS satellites and triangulating the vehicle's location based on the satellites' positions. In other embodiments, vehicle 108 does not include a GPS module, but the geographic position of vehicle 108 is obtained by accessing another positioning system through one or more networks 176. Various other sensors and capabilities may also be included in the navigation system, such as a speedometer for providing vehicle speed information.

The communication subsystem 182 may communicatively couples safety visualization system 100 to one or more other devices, systems, or communication networks. Communication subsystem 182 facilitates both communication between vehicle 108 and other external communication networks, and communication between devices associated with vehicle 108. For example, communication subsystem 182 can communicate with external communication networks through a satellite radio transceiver, a cellular network, a local area network, wide area network, a Near Field Communication (NFC) connection, or the Internet, for example. Communication subsystem 182 can facilitate communication between safety visualization system 100 and other computing devices associated with vehicle 108 or personal computer devices, for example, wired or wireless connections between a mobile computing devices and safety visualization system 100, wireless connections established via WiFi for Internet connections or to systems to exchange data over relatively short distances such as using Bluetooth®, or by establishing a local network so that one or more personal computing devices can communicate with each other and with safety visualization system 100. Accordingly, communication subsystem 182 may include one or more short or long range wired or wireless systems, network interface software, firmware, or hardware, for example, as may be needed pursuant to the specifications or design of the particular embodiment of the overall computing system.

Figure 7:
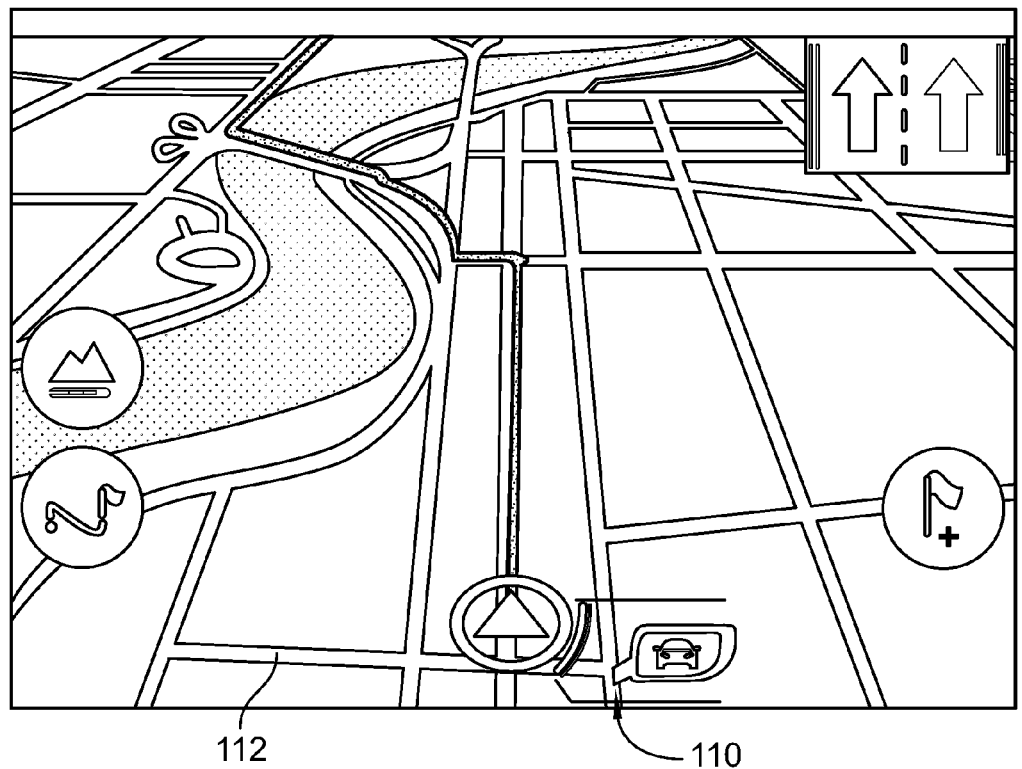
FIG. 7 shows a driver alert generated by a blind spot detection system, integrated with navigation map.

FIGS. 7-16 show exemplary display screens having driver alerts 110 integrated with navigation map 112. FIG. 7 shows a driver alert 110 generated, for example, by a blind spot detection system, integrated with map 112. Driver alert 110 is in the form of an image of a side view mirror with a vehicle in view, indicating the vehicle is approaching. This alert may also be generated on a side view mirror display. Thus, if the driver's attention is on map 112, the driver is more likely to observe the alert than if it was only generated on the side view mirror. The path of travel of the vehicle in which the safety visualization system is embodied may be considered in the position or positions in which driver alert 110 is displayed.

Figure 8:
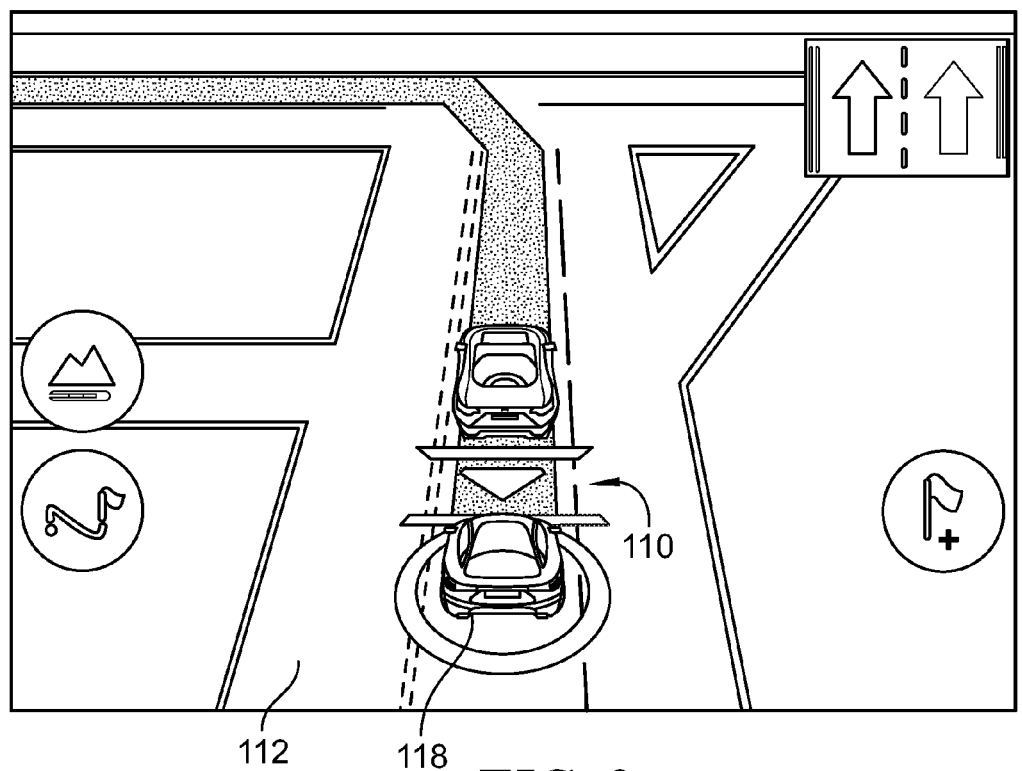
FIG. 8 shows a driver alert on a navigation map that indicates another vehicle is stopped in front of the driver vehicle.

FIG. 8 shows driver alert 110 on map 112 that indicates another vehicle is stopped in front of the driver vehicle, requiring hard braking. This alert may be generated, for example, by an adaptive cruise control system, indicating that a speed change is necessary to maintain the desired distance between vehicles traveling in the same lane, or may be generated by a collision alert system or other monitoring system that would recognize the approaching vehicle.

Figure 9:
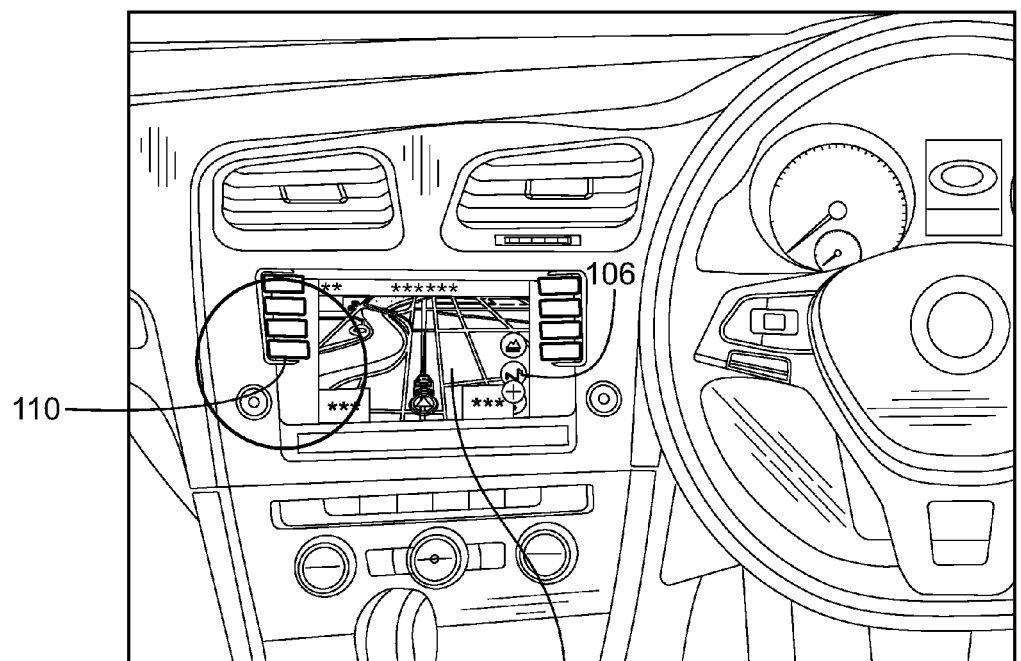
FIG. 9 depicts a driver alert in the form of an illuminated light emitting diode adjacent to a display screen on which a navigation map is displayed.

FIG. 9 depicts a driver alert 110 in the form of an illuminated LED adjacent to display screen 106 on which navigation map 112 is displayed. Although not directly on navigation map 112, driver alert 110 is within the driver's field of vision if the driver is engaged with the navigation system. Driver alerts placed next to a navigation system display screen can be advantageous because they can be utilized even when the navigation system is not activated. The location may also be beneficial if the driver's attention is directed to other devices in the vicinity, such as a radio or climate control adjustment device.

Figure 10:
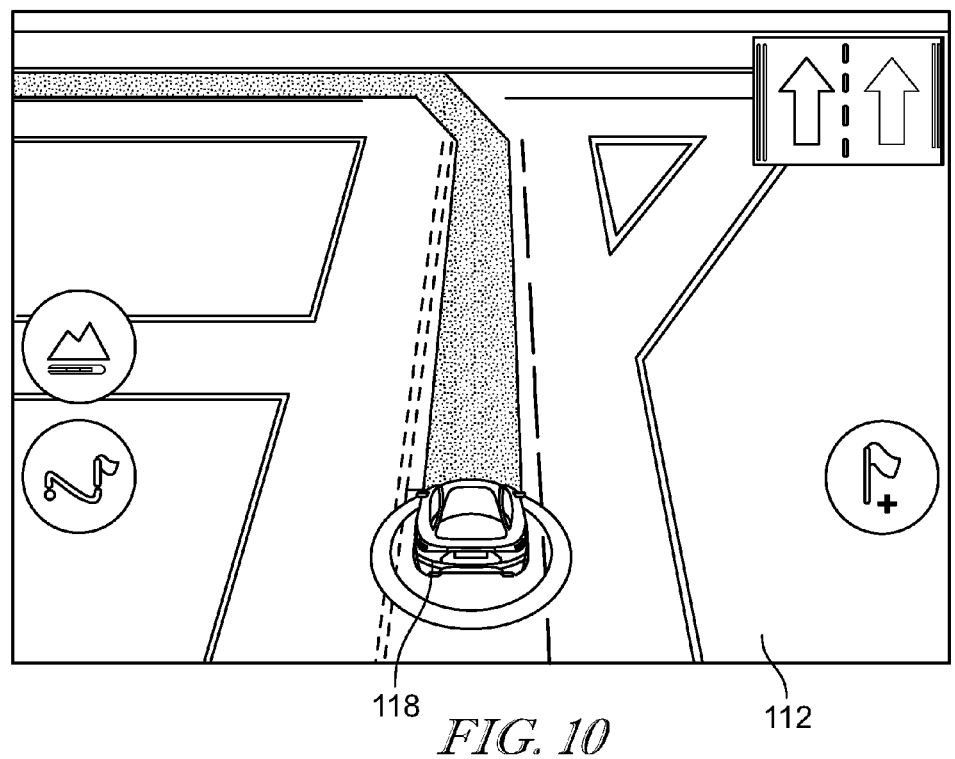
FIG. 10 shows a carsor on a navigation map.

FIG. 10 shows another driver alert 110 on navigation map 112.

Figure 11:
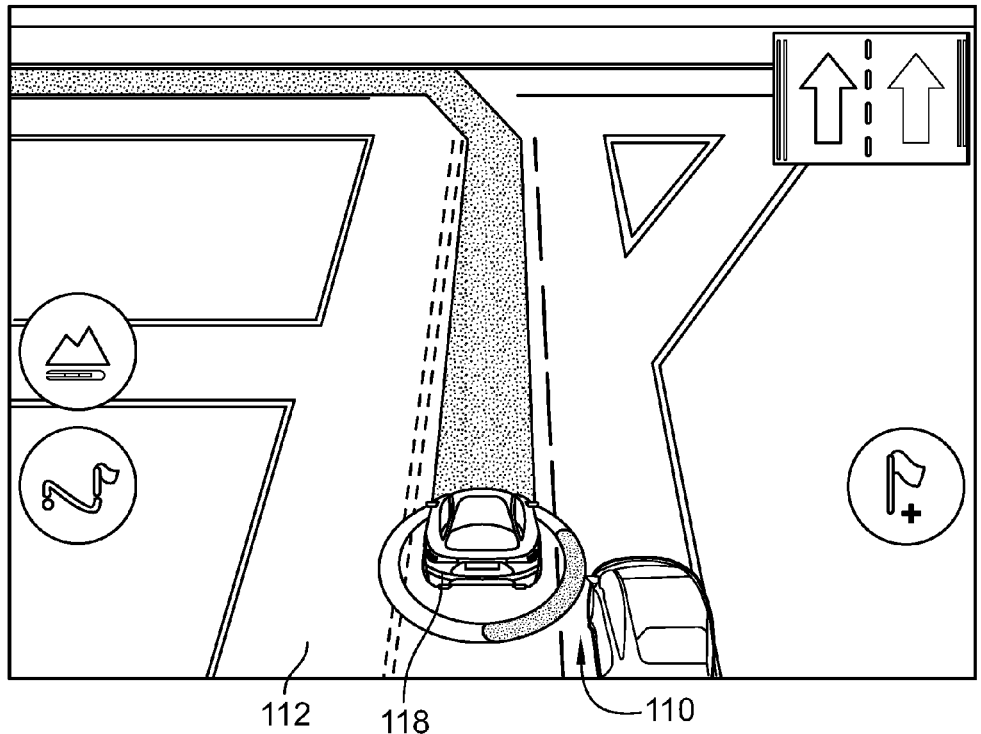
FIG. 11 depicts a driver alert that shows another vehicle in close proximity to the driver vehicle.

FIG. 11 depicts a driver alert that may be generated by a blind spot detection system, or a collision alert system, for example, showing another vehicle in close proximity.

Figure 12:
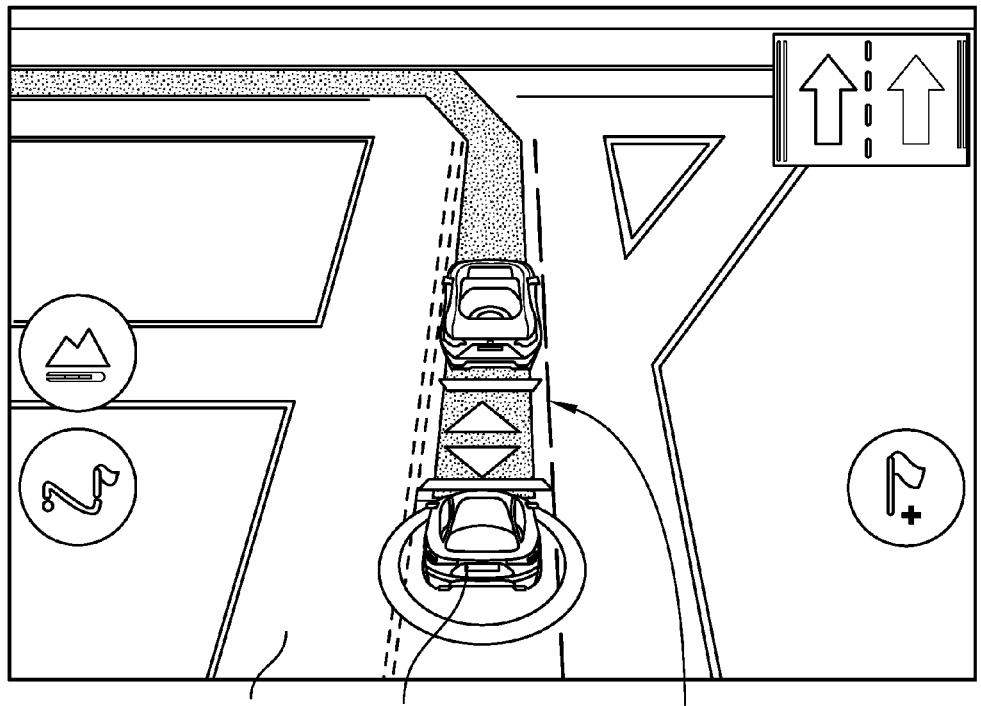
FIG. 12 shows a driver alert on a navigation map that indicates the separation between vehicles is increasing.

FIG. 12 shows a driver alert 110 on navigation map 112 that may be generated, for example, by an adaptive cruise control system that modifies vehicle speed to maintain a desired distance to cars traveling ahead. The alert indicates the separation between vehicles is increasing, and could also be generated by other monitoring systems that would recognize change in relative distance.

Figure 13:
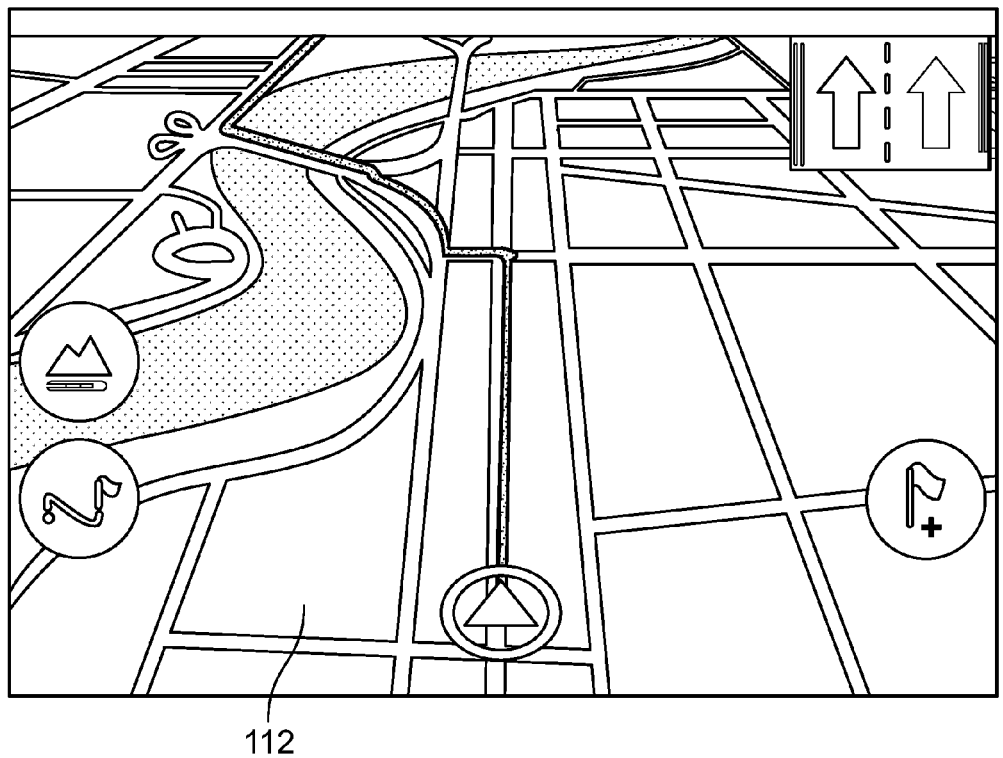
FIG. 13 depicts a navigation map that may be integrated with driver alerts.

FIG. 13 depicts a representation of a vehicle on navigation map 112 that may be integrated with driver alerts 110.

Figure 14:
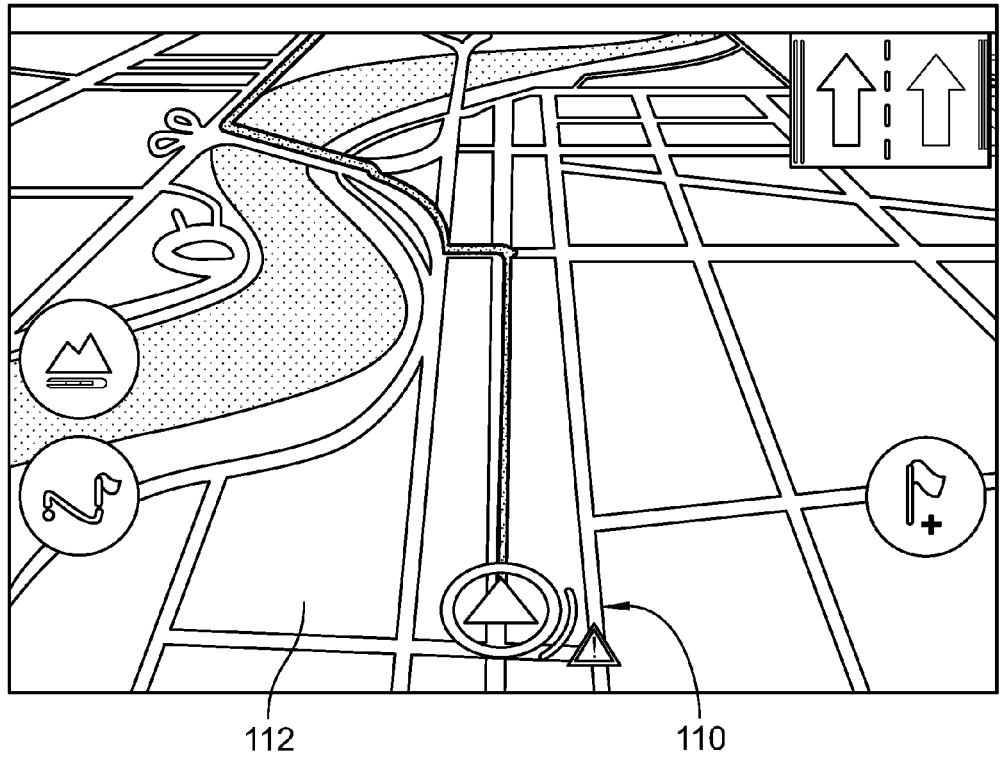
FIG. 14 shows a driver alert in the form of a warning that may be generated by a collision alert system or blind spot detection system.

FIG. 14 shows a driver alert 110 in the form of a warning that may be generated, for example, by a collision alert system or blind spot detection system. The warning icon may indicate that there is a vehicle in the blind spot on the right side of the driver vehicle.

Figure 15:
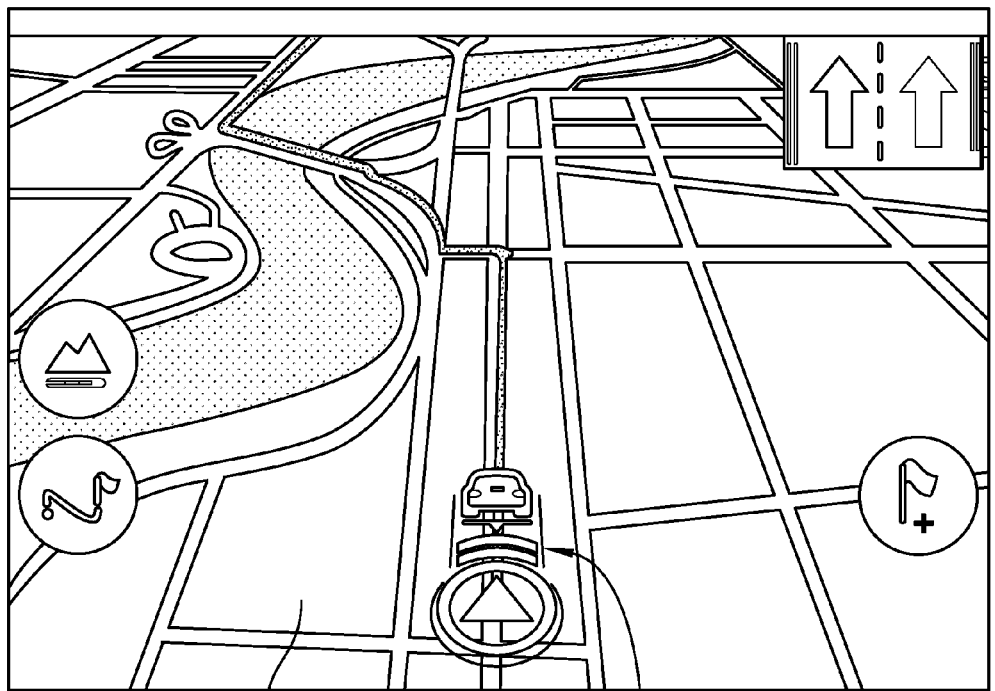
FIG. 15 depicts a driver alert indicating the driver vehicle is braking via ACC to maintain sufficient distance to another car ahead of it in its lane.

FIG. 15 depicts a driver alert 110 indicating the vehicle is braking via ACC to maintain sufficient distance to another car ahead of it in its lane.

Figure 16:
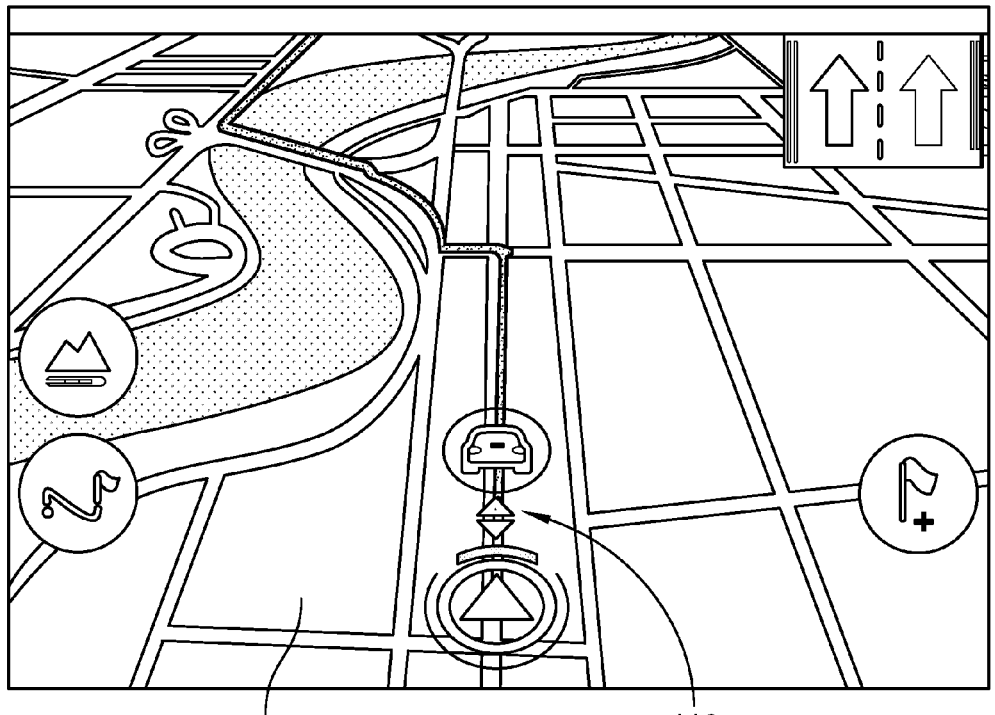
FIG. 16 depicts a driver alert showing the distance between the driver vehicle and the vehicle directly ahead is increasing.

FIG. 16 depicts a driver alert 110 showing the distance between the driver vehicle and the vehicle directly ahead is increasing, causing the ACC to accelerate until reaching a set ACC follow distance.

Driver alert systems may also generate defensive driving measures to address the events that generated the alerts.

The technical challenge is to provide a means for determining the optimum placement, appearance, timing or other relevant parameters of alerts with respect to a navigation map when a navigation system is in an activated mode to maximize the likelihood the driver will notice the alerts, thereby reducing the cognitive load experienced by the driver while interpreting the navigation map, and keeping the driver's attention on the task of driving.

Disclosed embodiments provide a solution to the above-described technical problems by providing an in-vehicle system for displaying alerts on or in close proximity to active navigation maps. The disclosed coordination between streams of information from a navigation systems and driver alert systems, which may include the nature and importance of events associated with alerts, analyzing these data, and dynamically displaying an alert on an active navigation map according to the relevant parameters may maximize the likelihood the driver will notice the alerts.

Various illustrative embodiments have been described, each having a different combination of elements. The invention is not limited to the specific embodiments disclosed, and may include different combinations of the elements disclosed, omission of some elements or the replacement of elements by the equivalents of such structures. Further, when a particular feature, structure, or characteristic is described in connection with an embodiment, it is believed to be within the knowledge of one skilled in the art to affect such feature, structure, or characteristic in connection with other embodiments whether or not explicitly indicated.

While the invention has been described by illustrative embodiments, additional advantages and modifications will occur to those skilled in the art. Therefore, the invention in its broader aspects is not limited to specific details shown and described herein. Modifications, for example, to computer architecture, order of method steps and types of electronic components, may be made without departing from the spirit and scope of the invention. Accordingly, it is intended that the invention not be limited to the specific illustrative embodiments, but be interpreted within the full spirit and scope of the appended claims and their equivalents.

The invention claimed is:

1. A safety visualization system for use with one or more vehicle alert systems operable to generate a primary vehicle alert signal, the safety visualization system comprising:
   a means for generating supplemental vehicle alerts from the one or more vehicle alert systems on a navigation system display when the navigation system is activated to supplement primary vehicle alerts generated by the vehicle alert systems in other locations, wherein the means for generating the supplemental vehicle alerts from the one or more vehicle alert systems on the navigation system display comprises:
      a display device configured to display information from the navigation system;
      a control system operable to depict the supplemental vehicle alert on the navigation system display generated by the one or more vehicle alert systems;
      the control system configured to determine whether the navigation system is activated;
      the control system having:
         one or more processors for receiving signals from the one or more vehicle alert systems;
         a non-transitory computer-readable storage medium in which is stored computer code that when executed on the one or more processors causes the control system to perform the method of:
            once the navigation system is activated, receiving a signal from the one or more vehicle alert systems; and
            presenting the supplemental vehicle alert simultaneously with navigation system information;
         wherein the system is configured to generate the supplemental vehicle alert on the navigation system display; and
         wherein the supplemental vehicle alert is positioned to reflect the spatial relationship of a hazard that triggered the supplemental vehicle alert with respect to a carsor depicted on the display device.

2. The safety visualization system of claim 1 wherein the method performed by the control system includes:
   determining an urgency level of the primary vehicle alert and configuring attributes of the supplemental vehicle alert based on the urgency level.

3. The safety visualization system of claim 2 wherein attributes are selected from the group consisting of light intensity, color, background, position and size.

4. The safety visualization system of claim 1 wherein the system is configured to represent the supplemental vehicle alert as a graphic showing the spatial relationship of the hazard with respect to the vehicle.

5. The safety visualization system of claim 4 wherein the spatial relationship of the hazard with respect to the vehicle is shown in real time.

6. A non-transitory computer-readable medium on which is stored computer code, which when executed on one or more processors causes a computer system to perform the method of:
receiving by a control system a signal indicating a navigation system is activated;
upon receiving the signal that the navigation system is activated, activating a safety visualization system;
receiving by the control system a signal from a vehicle alert system indicating the vehicle is encountering a hazard; and
displaying on a display device of the navigation system a supplemental vehicle alert based on the signal received from the vehicle alert system;
wherein the supplemental vehicle alert displayed by the control system is in addition to one or more primary vehicle alerts displayed by the vehicle alert system; and
wherein the supplemental vehicle alert is positioned to reflect the spatial relationship of a hazard that triggered the supplemental vehicle alert with respect to a carsor depicted on the display device.

7. The non-transitory computer-readable medium of claim 6 wherein the method includes determining an urgency level of the primary vehicle alert and configuring attributes of the vehicle alert based on the urgency level.

8. The non-transitory computer-readable medium of claim 7 wherein attributes are selected from the group consisting of light intensity, color, background, position and size.

9. The non-transitory computer-readable medium of claim 6 comprising generating the supplemental vehicle alert on the navigation system display positioned relative to a carsor corresponding to the relative position of the vehicle to a hazard that triggered the primary vehicle alert.

10. The non-transitory computer-readable medium of claim 6 wherein the method further includes representing the supplemental vehicle alert as a graphic showing the spatial relationship of the hazard with respect to the vehicle.

11. The safety visualization system of claim 10 wherein the method further comprises representing the spatial relationship of the hazard with respect to the vehicle in real time.

12. A vehicle having a safety visualization system for use with one or more vehicle alert systems operable to generate a primary vehicle alert signal, the safety visualization system comprising:
a means for generating supplemental vehicle alerts from the one or more vehicle alert systems on a navigation system display when the navigation system is activated to supplement the primary vehicle alerts generated by the vehicle alert systems in other locations wherein the means for generating the supplemental vehicle alerts from the one or more vehicle alert systems on the navigation system display comprises:
a display device configured to display information from the navigation system;
a control system operable to depict the supplemental vehicle alert on the navigation system display generated by the one or more vehicle alert systems;
the control system configured to determine whether the navigation system is activated;
the control system having:
one or more processors for receiving signals from the one or more vehicle alert systems;
a non-transitory computer-readable storage medium in which is stored computer code that when executed on the one or more processors causes the control system to perform the method of:
once the navigation system is activated, receiving a the primary vehicle alert signal from the one or more vehicle alert systems; and
presenting the supplemental vehicle alert simultaneously with navigation system information on the display device;
wherein the supplemental vehicle alert is positioned to reflect the spatial relationship of a hazard that triggered the supplemental vehicle alert with respect to a carsor depicted on the display device.

13. The vehicle of claim 12 wherein the method performed by the control system includes representing the supplemental vehicle alert as a graphic showing the spatial relationship of the hazard with respect to the vehicle.

14. The vehicle of claim 13 wherein the method performed by the control system further comprises representing the spatial relationship of the hazard with respect to the vehicle in real time.

* * * * *